United States Patent Office 2,960,486
Patented Nov. 15, 1960

2,960,486

POLYMER COMPOSITION AND METHOD

David J. Pye, Walnut Creek, Calif., assignor to The Dow Chemical Company, Midland, Mich., a corporation of Delaware No Drawing. Filed May 20, 1957, Ser. No. 660,051

6 Claims. (Cl. 260—45.7)

This invention is concerned with an acrylamide polymer composition and with the processing of acrylamide polymers.

In the manufacture of high molecular weight polymers and copolymers of acrylamide it has generally been found that complete conversion of acrylamide monomer to polymer is difficult to achieve in commercial practice. In such operations it is usually observed that at least about 0.5 percent and frequently one percent or more of the original acrylamide monomer charge remains as free monomer in the polymer or copolymer product. In view of the toxicity of acrylamide monomer to higher animals, it is desirable to have available a method for producing acrylamide polymers and copolymers substantially free of monomer particularly where the polymer or copolymer is to be employed in the clarification of water which may find its way into municipal water supplies or in the manufacture of paper which may be later employed in contact with foodstuffs.

It has further been found that high molecular weight polymers and copolymers of acrylamide, in aqueous solutions, are subject to more or less degradation at elevated temperatures. It would be desirable to have means for preventing such degradation.

The term "acrylamide polymer" as employed in the present specification and claims refers to the homopolymer of acrylamide and water-soluble copolymers of acrylamide with other suitable monoethylenic monomers. These acrylamide polymers are water-soluble and characterized by little or no cross-linking between polymer chains. Where the comonomer polymerized with acrylamide contains water-solubilizing groups, as for example in copolymers of acrylamide with acrylic acid, methacrylic acid, methacrylamide, vinylbenzylammonium compounds, vinylbenzene sulfonic acid, maleic acid and the like, the finished polymer may contain up to about 50 mole percent of units derived from such comonomer. With other comonomers containing no such solubilizing groups, such as ethylene, butylene, styrene, alkyl esters of acrylic and methacrylic acid, vinyl chloride, vinylidene chloride and the like, it is generally desirable that the finished copolymer contain no more than 25 mole percent of units derived from said comonomer. When the acrylamide polymer contains some free carboxyl groups, the polymer products appear to be equivalent whether the carboxyls result from copolymerization of acrylamide with an unsaturated acid such as acrylic acid or by hydrolysis of amide groups subsequent to polymerization.

It is an object of the present invention to provide a novel and improved composition comprising an acrylamide polymer. It is a further object of the invention to provide a method whereby residual monomer is substantially removed from acrylamide polymers. Another object is to provide a method for preventing the thermal degradation of acrylamide polymers. Other objects will become apparent from the following specification and claims.

In accordance with the present invention, it has been discovered that the incorporation of small amounts of sulfites in acrylamide polymers provides compositions having highly desirable properties. In one embodiment of the invention it has been found that compositions comprising an acrylamide polymer and a sulfite are markedly less subject to thermal degradation in aqueous solution than are the acrylamide polymers alone. In a further embodiment of the invention, it has been discovered that in such compositions comprising an acrylamide polymer and a sulfite, a transformation occurs whereby any residual amounts of acrylamide monomer remaining in the polymer are substantially reduced or in some way converted to derivatives of low toxicity.

The new composition may be prepared in any suitable fashion. In one mode of operation, a suitable metal sulfite in dry powdered form is mechanically mixed with the dry acrylamide polymer. Alternatively, an aqueous solution of a suitable sulfite is mixed with an aqueous solution of the polymer. In yet another mode of operation, the sulfite may be formed in situ in an aqueous solution of the polymer by introducing sulfur dioxide into said solution in gaseous form together with an equivalent amount of aqueous alkali metal hydroxide solution. In operations with aqueous solutions of acrylamide polymer wherein high molecular weight polymers are employed at concentrations of about 1 percent by weight or more, the solutions are characterized by relatively high viscosities which increase with increasing concentration or molecular weight of the polymer. With such solutions it is desirable to employ efficient mixing devices such as mixing mills, pumps or suitably designed enclosed augers to accomplish thorough mixing of the sulfite with the polymer solution.

The sulfite ingredient employed in the compositions of the present invention may be supplied by a variety of inorganic sulfites and bisulfites, provided that the latter are water-soluble and provided also that the sulfite addition does not introduce into the composition undesirable heavy metal ions such as excessive amounts of ions of copper, cobalt, iron, chromium and the like. Further, where the composition may subsequently be employed in water treatment, the introduction of poisonous ions such as those of lead, cadmium, barium and the like is to be avoided. Preferred sources of sulfite include the ammonium, magnesium and alkali metal sulfites and bisulfites, calcium bisulfite and the like.

The amount of the sulfite ingredient to be employed in the compositions will vary somewhat depending upon the result desired. Thus, where it is desired to produce a composition stabilized against thermal degradation in aqueous solution, good results have been obtained when employing from about 100 to 500 or more parts by weight of the sulfite per million parts by weight of acrylamide polymer solution. In solid compositions suitable for the preparation of aqueous solutions stabilized against thermal degradation, it is generally desirable to employ from about 0.5 to about 5 percent by weight of the sulfite in the composition.

Where the composition is designed to accomplish the elimination of residual amounts of acrylamide monomer remaining in the acrylamide polymer, aqueous compositions are employed and the sulfite is added in the amount of at least one mole per mole of residual monomer present in the solution. In such compositions, good results have been obtained when the pH of the composition is adjusted in the range of 4 to 9. Where such compositions are to be subsequently dried to produce a solid acrylamide polymer product, it is preferred to maintain the pH at from 6 to 9. In such compositions it is desirable to employ at least a slight molar excess of the sulfite in relation to the molar amount of residual monomer in the solution, however, where animal toxicity is of concern, excessive amounts of sulfite are to be avoided. In commercial practice, good results have been obtained when employing from slightly over one to about two moles of sulfite per mole of residual monomer.

In accordance with the method of the present invention, when it is desired to reduce the residual monomer content of an acrylamide polymer, a sulfite is incorporated in an aqueous solution or gel of the polymer in the proportion of at least one mole of sulfite per mole of residual monomer in the polymer, as set forth above, and the resulting composition is maintained for a period of time to complete the reaction whereby the monomer content is reduced. In practice, good results have been obtained when a composition as set forth above is maintained at a temperature of about 25° for a period of about 3 hours. At higher temperatures, the reduction of monomer content proceeds more rapidly and good reductions have been obtained when the acrylamide polymer solution and sulfite are mixed together and maintained for periods of 30 to 90 minutes at temperatures of from about 80° to about 100° C. In general, it is preferred to maintain the solution of acrylamide polymer and sulfite at a temperature of at least 80° C. for at least 30 minutes to assure the desired reduction in monomer content.

In the practice of the method of the present invention for inhibiting the thermal degradation of acrylamide polymers in aqueous solution, a small amount of a sulfite is incorporated in such solution in any suitable fashion. In such operations, it is desirable to maintain the composition of acrylamide polymer and sulfite out of contact with the air, particularly when such composition is exposed to temperatures much in excess of room temperature. In such operations where the composition can be maintained out of contact with the air, good results have been obtained when employing from about 100 to about 500 parts by weight of sulfite per million parts of acrylamide polymer solution. In operations where the solution must be exposed to air, particularly at high temperatures, larger amounts of sulfite may be incorporated in the composition initially or be added thereto from time to time as required to replace sulfite lost from the system by reason of oxidation.

The term "percent hydrolysis" as hereinafter employed in the characterization of acrylamide polymers refers to the percent of carboxamide groups in the homopolymer of acrylamide replaced by carboxyl groups. The term "viscosity," as similarly employed, refers to the viscosity in centipoises of an aqueous 0.5 percent by weight solution of the polymer adjusted to a temperature of 25° C. and a pH of 3 to 3.5 as determined with an Ostwald viscometer.

The following examples illustrate the invention but are not to be construed as limiting the same.

*Example 1*

A high molecular weight acrylamide homopolymer, characterized by hydrolysis of about 6 percent and a viscosity of 8.1 centipoises, was dissolved in water to prepare a solution containing 2 percent by weight of said polymer. A portion of this solution was placed in a glass tube 30 centimeters long and having an inner diameter of 9 millimeters. The tube was sealed so that a small bubble of air remained above the solution. A further portion of the acrylamide polymer solution was mixed with sodium sulfite to produce a composition containing 500 parts by weight of sodium sulfite per million parts of solution. This composition was placed in an exactly similar tube as with the untreated acrylamide polymer solution and sealed in a similar fashion. Each tube was maintained in an oven at a temperature of 90° C. for 165 hours. At that time, the tubes were removed from the oven and inverted, and the time for the bubbles to travel equal distances through the polymer solutions was determined as a measure of the viscosity of the solution. In the untreated blank solution, the viscosity had decreased so that the bubble traveled 21 centimeters in 7 seconds. In the tube containing the acrylamide polymer-sodium sulfite composition, the bubble required 28 seconds to travel the 21-centimeter distance. No degradation as evidenced by reduction in solution viscosity was found when the acrylamide polymer-sodium sulfite composition was maintained in an oven at 90° C. for a period of 500 hours.

*Example 2*

Compositions were prepared as aqueous solutions containing 2 percent by weight of the high molecular weight acrylamide polymer of Example 1, 2.2 percent by weight of sodium chloride, one part by weight of cobalt chloride per million parts of solution and varying amounts of sodium sulfite. An exactly similar composition was prepared without sodium sulfite or cobalt chloride to serve as a check. The pH of the compositions was adjusted to 7. The viscosity of each such composition was determined at 25° C. with a Brookfield viscometer, employing the No. 2 spindle at 30 revolutions per minute. Each composition was then sealed and maintained in an oven at 90° C. for a period of 32 hours. The compositions were then removed from the oven, cooled to 25° C. and the viscosity measured again as before. The results are summarized in the following table.

| Parts by Weight of $Na_2SO_3$ per Million Parts of Composition | Viscosity in Centipoises | |
|---|---|---|
| | Initial | After 32 Hours at 90° C. |
| None (Check) | 470 | 155 |
| 100 | 470 | 480 |
| 200 | 470 | 545 |
| 400 | 475 | 655 |

In consideration of Examples 1 and 2, it was concluded that the cobalt ion was not necessary in obtaining the desired effect with the sodium sulfite.

*Example 3*

The following illustrates the use of a sulfite to decrease residual monomer in an acrylamide polymer. An acrylamide polymer containing 2.1 percent by weight of acrylamide monomer was prepared in aqueous solution and the latter impregnated with an aqueous solution of sodium sulfite to prepare an aqueous composition containing 30 percent by weight of the acrylamide polymer and 1.6 percent by weight of sodium sulfite at a pH of 7.2. This composition was maintained in a drying oven at an air temperature of 120° C. for 90 minutes. The resulting dry polymer was analyzed and found to contain only 0.01 percent by weight of residual monomer based on the weight of polymer. This polymer was characterized by a viscosity of 13.4 centipoises.

*Example 4*

A commercial batch of high molecular weight acrylamide polymer was obtained in the form of an aqueous 15 percent by weight solution. The polymer was characterized by hydrolysis of about 5 percent and by a viscosity of about 11 centipoises. Analysis of this material showed that the composition contained about 1.5 percent residual acrylamide monomer based on the weight of polymer in the solution. Sodium sulfide was admixed with the above polymer solution by injecting an aqueous solution of the sulfite into a mixing pump as the polymer solution was pumped therethrough. The amount of sodium sulfite injected was adjusted to incorporate 1.9 moles of sodium sulfite per mole of residual acrylamide monomer in the polymer solution. The polymer solution had a pH of 5.5 to 6 and was at a temperature of about 80° C. in the mixing pump. The aqueous composition of acrylamide polymer and sodium sulfite was pumped onto a drum drier operating at about 100° C. and having an average holding time of about 1.5 hours. The dried polymer product obtained from the drier rolls was found to contain less than 0.02 percent by weight of residual monomer as compared to 1.34 percent by weight of residual monomer in a portion of the same batch of polymer solution dried in exactly similar fashion without admixture of the sodium sulfite.

*Example 5*

Following the general procedure of Example 4, a commercial batch of acrylamide polymer, having the approximate viscosity characteristics and residual monomer content of the bath employed in Example 4, is treated with sodium sulfite in the mixing pump. The polymer employed has 25 percent of the amide groups hydrolyzed to carboxyl groups. The sulfite treatment results in a finished polymer having a residual monomer content of only 0.01 percent by weight.

I claim:

1. A composition which consists essentially of an intimate mixture of an acrylamide polymer containing residual acrylamide monomer, said polymer being selected from homopolymers of acrylamide and water-soluble copolymers of the group consisting of copolymers of acrylamide with up to about 50 mole percent of a member of the group consisting of acrylic acid, methacrylic acid, methacrylamide, vinylbenzyl-ammonium compounds, vinylbenzene sulfonic acid and maleic acid and copolymers of acrylamide with up to 25 mole percent of a member of the group consisting of ethylene, butylene, styrene, alkyl esters of acrylic acid, alkyl esters of methacrylic acid, vinyl chloride and vinylidene chloride, with a sulfite selected from the group consisting of ammonium, magnesium and alkali metal sulfites and bisulfites and calcium bisulfite, said sulfite being employed in the amount of at least 1 mole of sulfite per mole of residual unreacted acrylamide monomer in said polymer.

2. A composition which consists of the composition of claim 1 in aqueous solution.

3. A composition in accordance with claim 1 wherein the sulfite is employed in the amount of from about 1 to about 2 moles per mole of residual acrylamide monomer in the polymer.

4. A method for reducing the residual acrylamide monomer content of a polymer selected from homopolymers of acrylamide and water-soluble copolymers of the group consisting of copolymers of acrylamide with up to about 50 mole percent of a member of the group consisting of acrylic acid, methacrylic acid, methacrylamide, vinylbenzylammonium compounds, vinylbenzene sulfonic acid and maleic acid and copolymers of acrylamide with up to 25 mole percent of a member of the group consisting of ethylene, butylene, styrene, alkyl esters of acrylic acid, alkyl esters of methacrylic acid, vinyl chloride and vinylidene chloride, which comprises forming an aqueous solution of said polymer and incorporating therein as the sole added reactive ingredient a sulfite selected from the group consisting of ammonium, magnesium and alkali metal sulfites and bisulfites and calcium bisulfite, said sulfite being employed in the amount of at least one mole per mole of acrylamide monomer in the solution.

5. A method according to claim 4 wherein the solution is maintained at a temperature of from 80° to 100° C. for a period of from 30 to 90 minutes.

6. A method according to claim 5 wherein the sulfite is employed in the amount of from one to about two moles per mole of residual acrylamide monomer in the polymer.

References Cited in the file of this patent

UNITED STATES PATENTS

| | | |
|---|---|---|
| 2,761,834 | Suen et al. | Sept. 4, 1956 |
| 2,777,832 | Mallison | Jan. 15, 1957 |

FOREIGN PATENTS

| | | |
|---|---|---|
| 521,324 | Canada | Jan. 3, 1956 |